United States Patent
Shiga (10) Patent No.: US 10,967,768 B2
(45) Date of Patent: Apr. 6, 2021

(54) VEHICLE SEAT

(71) Applicant: Toyota Jidosha Kabushiki Kaisha, Toyota (JP)

(72) Inventor: Kazuyuki Shiga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/523,162

(22) Filed: Jul. 26, 2019

(65) Prior Publication Data

US 2020/0039397 A1 Feb. 6, 2020

(30) Foreign Application Priority Data

Aug. 2, 2018 (JP) .............................. JP2018-146147

(51) Int. Cl.
*B60N 2/56* (2006.01)

(52) U.S. Cl.
CPC ......... *B60N 2/5657* (2013.01); *B60N 2/5628* (2013.01)

(58) Field of Classification Search
CPC .. B60N 2/5657; B60N 2/5628; B60N 2/5635; B60H 1/00285; Y10S 454/907
See application file for complete search history.

(56) References Cited

U.S. PATENT DOCUMENTS

| 4,258,555 | A | * | 3/1981 | Scharm | B60H 1/00007 62/244 |
|---|---|---|---|---|---|
| 5,092,395 | A | * | 3/1992 | Amidzich | B60N 3/18 165/41 |
| 5,385,382 | A | * | 1/1995 | Single, II | A47C 7/74 297/180.13 |
| 6,059,018 | A | * | 5/2000 | Yoshinori | B60H 1/00285 165/41 |
| 7,647,780 | B2 | * | 1/2010 | Aoki | B60N 2/5635 62/3.61 |
| 10,479,241 | B2 | * | 11/2019 | Filipkowski | B60N 2/22 |
| 2011/0226461 | A1 | | 9/2011 | Fujii et al. | |
| 2019/0047449 | A1 | * | 2/2019 | Fujii | B60N 2/5657 |
| 2019/0241043 | A1 | * | 8/2019 | Ito | B60N 2/002 |
| 2019/0337429 | A1 | * | 11/2019 | McElroy | B60N 2/5657 |

FOREIGN PATENT DOCUMENTS

| JP | 2008168776 A | 7/2008 |
|---|---|---|
| JP | 2011194908 A | 10/2011 |

* cited by examiner

*Primary Examiner* — Philip F Gabler
(74) *Attorney, Agent, or Firm* — Dinsmore & Shohl LLP (57) ABSTRACT

A vehicle seat includes a seat main body having a seat back, and disposed at a vehicle front side of a seating position at an end side in a vehicle width direction of a rear seat; and a flow path having one end side and another end side, conditioned air flowing through the one end side, the conditioned air being produced by an air-conditioning device mounted at the vehicle, the other end side being disposed inside the seat main body, another end of the flow path opening at a vehicle rear surface of the seat back, and the conditioned air flowing through an inside of the flow path and being blown from the other end towards a vehicle rear side of the seat back.

6 Claims, 5 Drawing Sheets

VEHICLE SEAT

CROSS-REFERENCE TO RELATED APPLICATION

This application is based on and claims priority under 35 USC 119 from Japanese Patent Application No. 2018-146147 filed on Aug. 2, 2018, the disclosure of which is incorporated by reference herein in its entirety.

BACKGROUND

Technical Field

The present disclosure relates to a vehicle seat that is mounted in a vehicle.

Related Art

A vehicle disclosed, for example, in Japanese Patent Application Laid-Open (JP-A) No. 2011-194908 is provided with a seat air-conditioning duct. One end of the seat air-conditioning duct is connected to an air-conditioning device, while another end of the seat air-conditioning duct is disposed inside a front seat. Conditioned air (for example, cool air) produced by the air-conditioning device flows through the seat air-conditioning duct and is subsequently blown out from the other end of the air-conditioning duct onto a seating surface side of a seat cushion of the front seat and a seat front surface side of a seat back of this front seat.

A structure may also be considered in which one end of a rear air-conditioning duct, which is a different duct from the seat air-conditioning duct, is connected to the air-conditioning device, and another end of this rear air-conditioning duct opens, for example, at a vehicle rear-side surface of a center console of the vehicle so as to blow conditioned air towards the rear seat side.

If the rear seat is formed by what is known as a bench seat, then vehicle occupant seating positions are set at both end sides in the vehicle width direction of the rear seat, in other words, at the vehicle rear side of a driver's seat and at the vehicle rear side of a front passenger's seat on the rear seat, and also in a central portion in the vehicle width direction on the rear seat.

Generally, when vehicle occupants are sitting in the rear seat, the seating positions on both end sides in the vehicle width direction of the rear seat are used, while if, for example, three vehicle occupants are sitting in the rear seat, then the seating position in the central portion in the vehicle width direction is also used. In other words, generally, it is more common for the seating positions on both end sides in the vehicle width direction of the rear seat to be used than the seating position in the central portion in the vehicle width direction.

Here, the seating positions on the end sides in the vehicle width direction of the rear seat are located diagonally on the vehicle rear-left side and diagonally on the vehicle rear-right side looking from the vehicle rear-side surface of the center console, and are somewhat distant from the vehicle rear-side surface of the center console. Because of this, it is difficult to ensure that the conditioned air blown out from the duct aperture located at the vehicle rear-side surface of the center console is supplied efficiently to vehicle occupants sitting in the positions on the two end sides in the vehicle width direction of the rear seat.

SUMMARY

The present disclosure was conceived in view of the above-described circumstances and provides a vehicle seat that enables conditioned air to be supplied efficiently to vehicle occupants sitting in the sitting positions on the end sides in the vehicle width direction of the rear seat.

A vehicle seat of a first aspect of the present disclosure includes a seat main body that has a seat back, and the seat main body is disposed at a vehicle front side of a seating position at an end side in a vehicle width direction of a rear seat; and a flow path having one end side and another end side, conditioned air flows through the one end side, the conditioned air is produced by an air-conditioning device mounted at the vehicle, the other end side is disposed inside the seat main body, another end of the flow path opens at a vehicle rear surface of the seat back, and the conditioned air flows through the inside of the flow path and is blown from the other end towards a vehicle rear side of the seat back.

In the vehicle seat of the first aspect, conditioned air produced by an air-conditioning device flows through a flow path from one end side of that flow path. Another end of the flow path opens at a vehicle rear surface of a seat back of the seat main body, and conditioned air that flows through the flow path is blown from the other end towards the vehicle rear side of the seat back. Here, the seat main body is disposed at a vehicle front side of a seating position at an end side in the vehicle width direction of the rear seat. Because of this, compared with a structure in which the other end side of the flow path is situated closer to a central portion in the vehicle width direction than the seat main body, a distance between the other end side of the flow path and a vehicle occupant who is sitting at a sitting position of an end side in the vehicle width direction of the rear seat can be shortened. Accordingly, conditioned air can be supplied efficiently to vehicle occupants who are sitting at sitting positions of the two end sides in the vehicle width direction of the rear seat.

A vehicle seat of a second aspect of the present disclosure is characterized in that, in the vehicle seat of the first aspect, there is provided an opening/closing device that is provided at the flow path or at the seat back so as to be able to open and close the flow path, and that, when in an open state, allows the conditioned air to be blown towards the vehicle rear side of the seat back, and when in a closed state, closes off the flow path so as to inhibit or prevent the conditioned air from being blown towards the vehicle rear side of the seat back.

According to the vehicle seat of the second aspect, an opening/closing device is provided at the flow path or in the seat back. This opening/closing device is able to open and close the flow path, and when the opening/closing device is in an open state, it allows the conditioned air flowing through the flow path to be blown towards the vehicle rear side of the seat back. In contrast, when the opening/closing device is in a closed state, the flow path is closed off by the opening/closing device. As a consequence, the discharge of conditioned air towards the vehicle rear side of the seat back is either inhibited or prevented.

A vehicle seat of a third aspect of the present disclosure is characterized in that, in the vehicle seat of the second aspect, the opening/closing device is provided with a placement portion that is provided at the seat back, and when the opening/closing device is in the closed state, the placement portion closes off the other end of the flow path, while when the opening/closing device is in the open state, the placement portion extends towards the vehicle rear side from the seat back, and an article is able to be placed on the placement portion at the vehicle rear side of the other end of the flow path.

According to the vehicle seat of the third aspect, the opening/closing device is provided with a placement portion that is provided at the seat back. When the opening/closing device is in a closed state, the other end of the flow path is closed off by the placement portion. In contrast, when the opening/closing device is in an open state, the placement portion extends towards the vehicle rear side from the seat back. In this state, an article can be placed on the placement portion. Moreover, the article that is placed on the placement portion is disposed on the seat rear side of the other end of the flow path. Because of this, conditioned air can be blown against the article on the placement portion.

The vehicle seat of the fourth aspect of the present disclosure is characterized in that, in the vehicle seat of the third aspect, the opening/closing device is provided with an inhibiting portion that is able to contact the article placed on the placement portion from a vehicle front-rear direction side and from a vehicle width direction side thereof, and the inhibiting portion, by contacting the article, is able to inhibit movement of the article in the vehicle front-rear direction and in the vehicle width direction.

According to the vehicle seat of the fourth aspect, the opening/closing device is provided with an inhibiting portion. The inhibiting portion is able to contact an article placed on the placement portion from a vehicle front-rear direction side and from a vehicle width direction side thereof, and movement of the article in the seat front-rear directions and in the seat width directions is inhibited by the inhibiting portion coming into contact the article. As a result, the attitude of the article can be kept stable on top of the placement portion.

The vehicle seat of the fifth aspect of the present disclosure is characterized in that, in the vehicle seat of any one of the first through fourth aspects, the other end of the flow path is disposed further toward a vehicle upper side than a vehicle rear-side end portion of a center console that is provided closer to a central portion in the vehicle width direction than the seat main body.

According to the vehicle seat of the fifth aspect, the other end of the flow path is disposed at further toward a vehicle upper side than a vehicle rear-side end portion of a center console that is provided closer to a central portion in the vehicle width direction than the seat main body. Because of this, conditioned air can be effectively blown towards an upper body of a vehicle occupant who is sitting at a sitting position on an end portion side in the vehicle width direction of a rear seat.

A vehicle seat of a sixth aspect of the present disclosure is characterized in that, in the vehicle seat of any one of the first through fifth aspects, a branch is formed at the flow path between the one end and the other end thereof so that the flow path is able to extend to both sides in the vehicle width direction of the seat back and opens at both sides of the seat back, and the conditioned air can be discharged through openings at both sides towards a vehicle front side of the seat back.

According to the vehicle seat of the sixth aspect, the flow path is able to discharge conditioned air towards the vehicle front side of the seat back. Because of this, conditioned air can be supplied effectively to the body of a vehicle occupant sitting at the seat main body or to the vicinity of the occupant body.

The vehicle seat of the seventh embodiment of the present disclosure is characterized in that, in the vehicle seat of any one of the first through sixth aspects, the vehicle seat further includes a restricting device that is provided at the flow path, and the restricting device is able to switch between an unrestricted state in which the conditioned air is capable of being blown towards the vehicle front side of the seat back, and a restricted state in which the blowing of the conditioned air towards the vehicle front side of the seat back is restricted.

According to the vehicle seat of the seventh aspect, a restricting device is provided at the flow path, and the restricting device is able to switch between an unrestricted state and a restricted state. When the restricting device is in the unrestricted state, conditioned air can be blown towards the vehicle front side of the seat back. In contrast to this, when the restricting device is in the restricted state, the discharge of conditioned air towards the seat front side of the seat back is restricted. As a result, it is possible to increase the quantity of conditioned air discharged towards the seat rear side by reducing or eliminating the quantity of conditioned air discharged towards the vehicle front side of the seat back.

As has been described above, the vehicle seat of the first aspect enables conditioned air to be supplied efficiently to a vehicle occupant sitting at a sitting position on an end side in the vehicle width direction of a rear seat.

The vehicle seat of the second aspect enables conditioned air to be discharged towards a vehicle occupant sitting at a rear seat when an opening/closing device is in an open state, and enables the discharge of conditioned air towards the seat rear side of a seat back to be inhibited when the opening/closing device is in a closed state.

The vehicle seat of the third aspect enables conditioned air to be blown against an article placed on a placement portion of the opening/closing device.

The vehicle seat of the fourth aspect enables the attitude of an article to be kept stable.

The vehicle seat of the fifth aspect enables conditioned air to be supplied effectively to an upper body of a vehicle occupant sitting at a rear seat.

The vehicle seat of the sixth aspect enables conditioned air to be supplied effectively to the body of a vehicle occupant sitting at the seat main body or to the vicinity of the occupant body.

The vehicle seat of the seventh aspect enables the quantity of conditioned air discharged towards the seat rear side to be increased.

BRIEF DESCRIPTION OF THE DRAWINGS

Exemplary embodiments of the present disclosure will be described in detail based on the following figures, wherein.

DETAILED DESCRIPTION

Hereinafter, respective exemplary embodiments of the present disclosure will be described based on the respective drawings of FIG. 1 through FIG. 5.

Note that an arrow FR indicates a front side (i.e., a front side in a vehicle front-rear direction) of a vehicle 12 in which a front seat 10 that is serving as a vehicle seat according to the exemplary embodiments has been applied, and also indicates a seat front side (i.e., a front side in a seat front-rear direction) of the front seat 10. In addition, an arrow UP indicates a vehicle upper side (i.e., an upper side in a vehicle up-down direction), and also indicates a seat upper side (i.e., an upper side in a seat up-down direction). Furthermore, an arrow LH indicates a left side in a vehicle width direction (i.e., a left side in a vehicle left-right direction), and also indicates a left side in a seat width direction.

First Exemplary Embodiment

Figure 2:
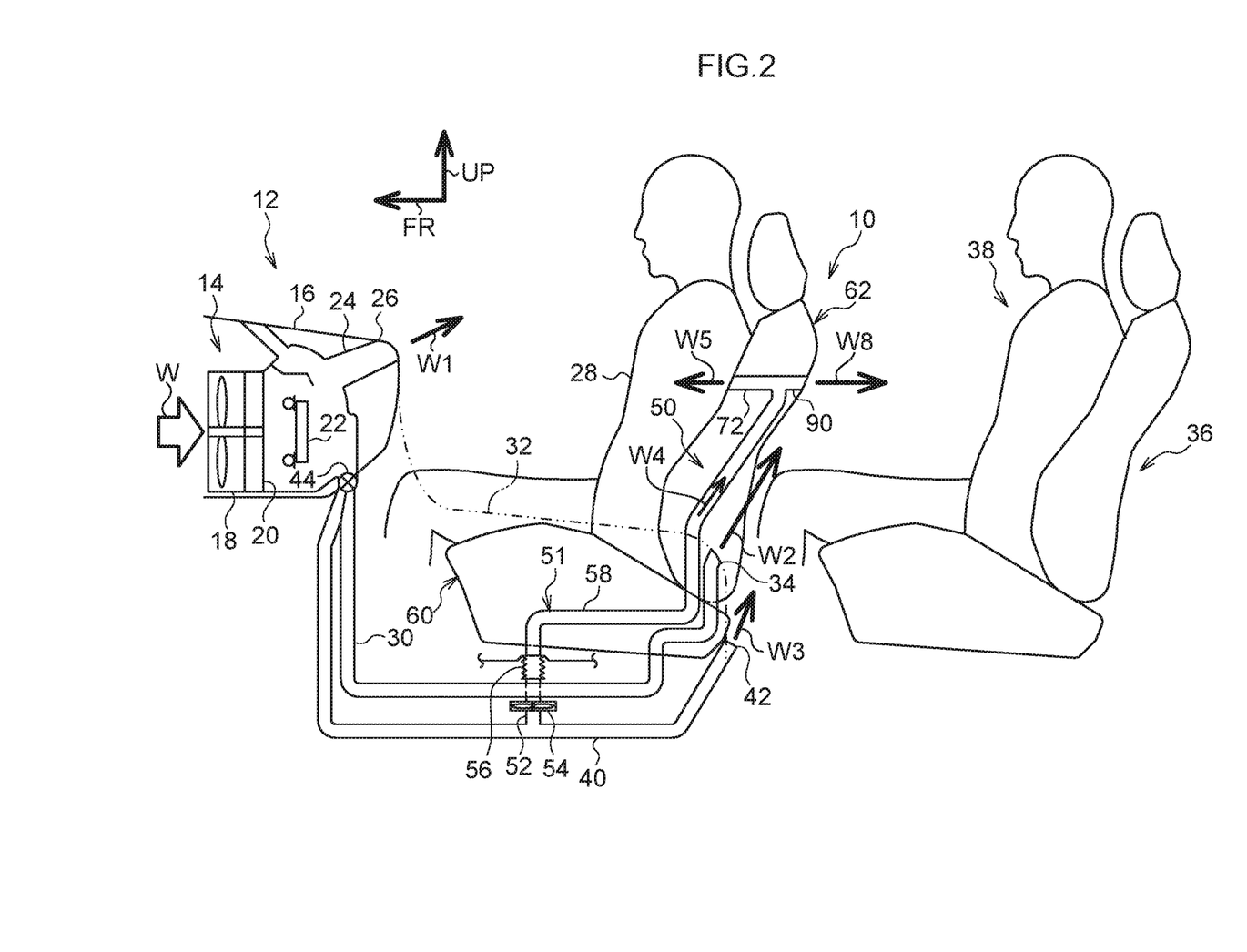
FIG. 2 is a side view showing a system of an air-conditioning device of a vehicle in which the vehicle seat according to the first exemplary embodiment has been applied.

As is shown in FIG. 2, the vehicle 12 in which the front seat 10 according to a first exemplary embodiment is applied is provided with an HVAC (Heating, Ventilation, and Air-Conditioning) unit 14 which is serving as an air-conditioning device main body that forms an air-conditioning device. The HVAC unit 14 is disposed at a vehicle front-lower side of an instrument panel 16 of the vehicle 12. The HVAC unit 14 is provided with a main fan 18, and an airflow W is generated as a result of the main fan 18 being operated. An evaporator 20 and a heater core 22 and the like are provided on a downstream side of the airflow W (i.e., on the vehicle rear side in FIG. 2) from the main fan 18, so that the airflow W forms conditioned air whose temperature and humidity and the like have been conditioned.

One end of a front face duct 24 is connected to the HVAC unit 14. Another end of the front face duct 24 is connected to a front face blower portion 26. The front face blower portion 26 is provided at a vehicle rear-side portion of the instrument panel 16, and the airflow W flowing from the HVAC unit 14 towards the front face duct 24 is blown as an airflow W1, which is serving as conditioned air, towards the vehicle rear side from the front face blower portion 26. As a result, the airflow W1 flows towards an upper body of a front-side vehicle occupant 28 (for example, towards the vicinity of a facial area of the front-side vehicle occupant 28) who is sitting at the front seat 10.

In addition, one end of a rear face duct 30 is connected to the HVAC unit 14. Another end side of the duct 30 is disposed at the vehicle lower side of a center console 32. The center console 32 is provided between one front seat 10 which is serving as a driver's seat, and another front seat 10 which is serving as a front passenger's seat, and the other end side of the rear face duct 30 extends towards the vehicle rear side at the vehicle lower side of the center console 32.

The other end of the rear face duct 30 is connected to a rear face blower portion 34. The rear face blower portion 34 is disposed at an upper-side portion of a vehicle rear-side end portion of the center console 32. The airflow W (for example, cool air) flowing from the HVAC unit 14 towards the rear face duct 30 is blown as an airflow W2 from the rear face blower portion 34 towards the vehicle upper rear side. As a result, the airflow W2 flows towards an upper body of a rear-side vehicle occupant 38 who is sitting at the rear seat 36.

One end of a rear foot duct 40 is connected to the HVAC unit 14. Another end of the rear foot duct 40 is connected to a rear foot blower portion 42. The rear foot blower portion 42 is provided, for example, at the vehicle lower side of a vehicle rear-side end portion of the front seat 10. The airflow W (for example, warm air) flowing from the HVAC unit 14 towards the rear foot duct 40 is blown as an airflow W3 from the rear foot blower portion 42 towards the vehicle rear side. As a result, the airflow W3 flows towards the feet of the rear-side vehicle occupant 38.

A switching module 44, which is serving as a switching device, is provided at the respective one end sides of the above-described rear face duct 30 and rear foot duct 40. The switching module 44 is provided, for example, with a damper. The damper is mechanically connected, for example, to a damper motor via a deceleration mechanism (neither of these are shown in the drawings), and the damper is moved reciprocatingly by drive force from the damper motor.

As a result of the damper being moved to one side of a range of this reciprocating motion, the switching module 44 is placed in a first state. In this first state, either all of or a large majority of the one end of the rear face duct 30 is closed off by the damper, while the one end of the rear foot duct 40 is opened up. As a result, either all of or a large majority of the airflow W (for example, warm air) produced by the HVAC unit 14 and flowing to the vicinity of the one end of the rear foot duct 40 and the one end of the rear face duct 30 flows to the rear foot duct 40.

In contrast to the first state of the damper, in a second state of the damper, the one ends of both the rear face duct 30 and the rear foot duct 40 are partially opened by the damper. As a result, the airflow W (for example, cool air) produced by the HVAC unit 14 and flowing to the vicinity of the one end of the rear face duct 30 and the one end of the rear foot duct 40 is split so as to flow to both the rear face duct 30 and the rear foot duct 40.

The vehicle 12 is also provided with a seat ventilation system 50. The seat ventilation system 50 is provided with a branch duct 52. One end of the branch duct 52 is connected to roughly an intermediate portion of the rear foot duct 40 at the vehicle lower side of the front seat 10.

Another end of the branch duct 52 is connected to a seat lower-side fan 54 which is serving as a blower device. When operated, the seat lower-side fan 54 suctions air on a branch duct 52 side. Because of this, when the seat lower-side fan 54 is operated, at least a portion of the airflow W flowing through the rear foot duct 40 flows into the branch duct 52 as an airflow W4 so that the flow of the airflow W towards the rear foot blower portion 42 side is either prevented or inhibited. Additionally, one end of a seat-side duct 56 is connected to the seat lower-side fan 54. Air suctioned by the seat lower-side fan 54, namely, the airflow W4 is supplied to the seat-side duct 56 and flows through the seat-side duct 56

Another end of the seat-side duct 56 is connected to one end of a seat interior duct 58 that forms part of a flow path 51. The seat interior duct 58 is provided at an inner side of a seat cushion 60 that forms part of a seat main body of the front seat 10 and at an inner side of a seat back 62 that forms part of the seat main body of the front seat 10. One end of the seat interior duct 58 opens onto a vehicle lower side end of the seat cushion 60. Here, the seat-side duct 56 is formed, for example, in a bellows shape. Because of this, it is possible for the seat-side duct 56 to be deformed in such a way that the other end-side portion of the seat-side duct 56 moves in the vehicle front-rear direction and in the vehicle up-down direction relative to the one end-side portion of the seat-side duct 56. As a consequence of this, without the position of the one end of the seat-side duct 56 being changed, the other end of the seat-side duct 56 is able to follow movement of the front seat 10 in the vehicle front-rear direction and in the vehicle up-down direction.

Figure 4:
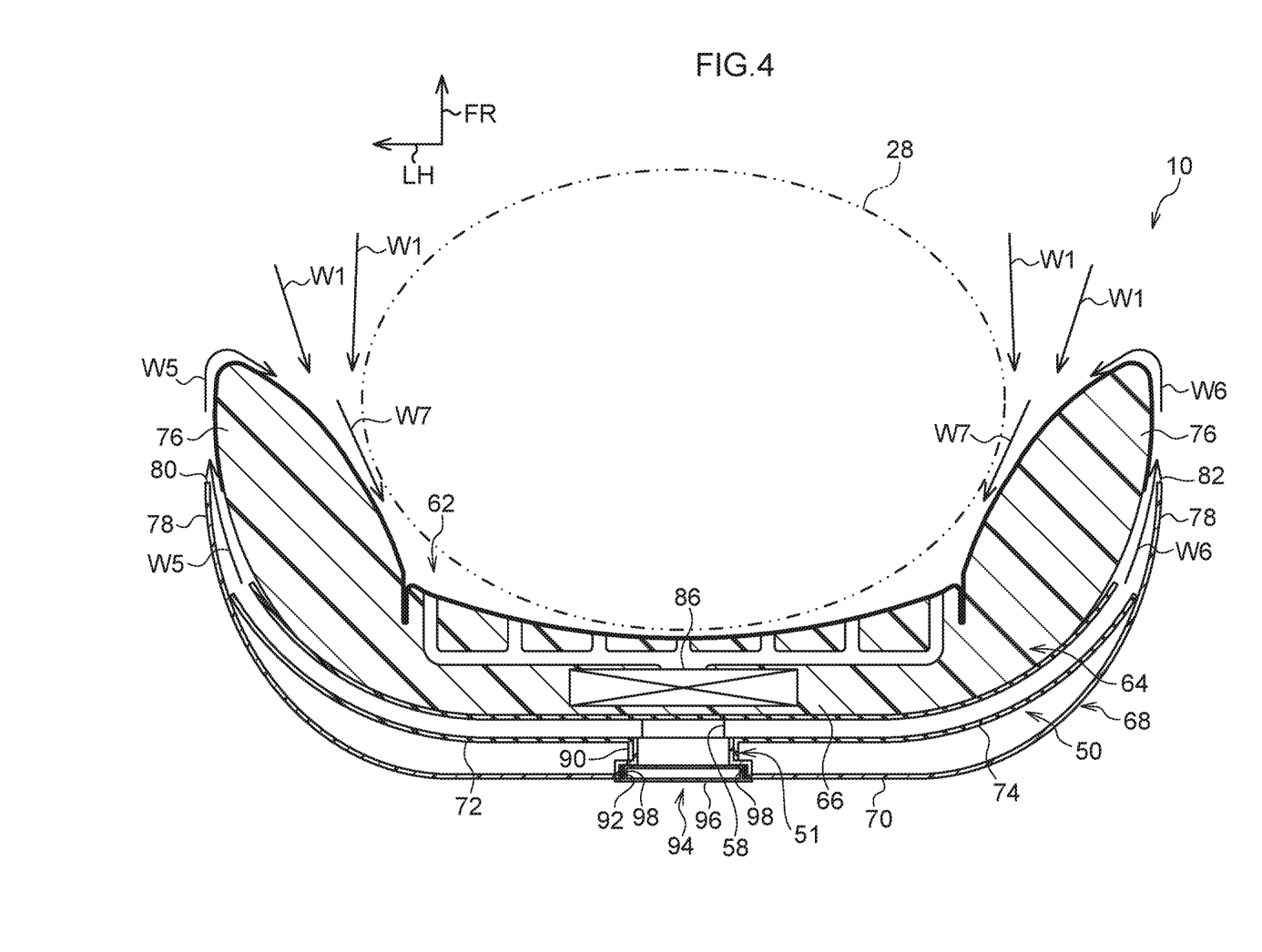
FIG. 4 is a cross-sectional view of a seat back taken across a line 4-4 in FIG. 3.

As is shown in FIG. 4, another end side of the seat interior duct 58 is disposed between a pad central portion 66 of a seat pad 64, that forms part of the seat back 62 of the front seat 10, and a back plate portion 70 of a backboard 68. The other end portion of the seat interior duct 58 is connected to one end of a left-side duct 72, that forms part of the flow path 51, and a right-side duct 74, that also forms part of the flow path 51.

Another end side of the left-side duct 72 extends towards the left side in the vehicle width direction, and the other end portion of the left-side duct 72 is disposed between a pad side portion 76 of the seat pad 64 and a side plate portion 78 of the backboard 68 at the left side in the vehicle width direction. A portion of the airflow W4 passing through the seat interior duct 58 can be made to flow through an inside of the left-side duct 72 as an airflow W5 and blown out towards the vehicle front side from the other end of the left-side duct 72.

A portion between a vehicle front-side end of the side plate portion 78 of the backboard 68 and the pad side portion 76 of the seat pad 64 forms a left-side blower portion 80 which is serving as a blower portion at the left side in the vehicle width direction. The airflow W5 that is blown out from the other end of the left-side duct 72 is blown from the left-side blower portion 80 towards the vehicle front side, and flows towards the vehicle front side along a surface on the left side in the vehicle width direction of the pad side portion 76.

In contrast to this, another end side of the right-side duct 74 extends towards the right side in the vehicle width direction, and the other end portion of the right-side duct 74 is disposed between the pad side portion 76 of the seat pad 64 and the side plate portion 78 of the backboard 68 at the right side in the vehicle width direction. A portion of the airflow W4 passing through the seat interior duct 58 can be made to flow through an inside of the right-side duct 74 as an airflow W6 and blown out towards the vehicle front side from the other end of the right-side duct 74.

A portion between a vehicle front-side end of the side plate portion 78 of the backboard 68 and the pad side portion 76 of the seat pad 64 forms a right-side blower portion 82 which is serving as a blower portion at the right side in the vehicle width direction. The airflow W6 that is blown out from the other end of the right-side duct 74 is blown from the right-side blower portion 82 towards the vehicle front side, and flows towards the vehicle front side along a surface on the right side in the vehicle width direction of the pad side portion 76.

Figure 3:
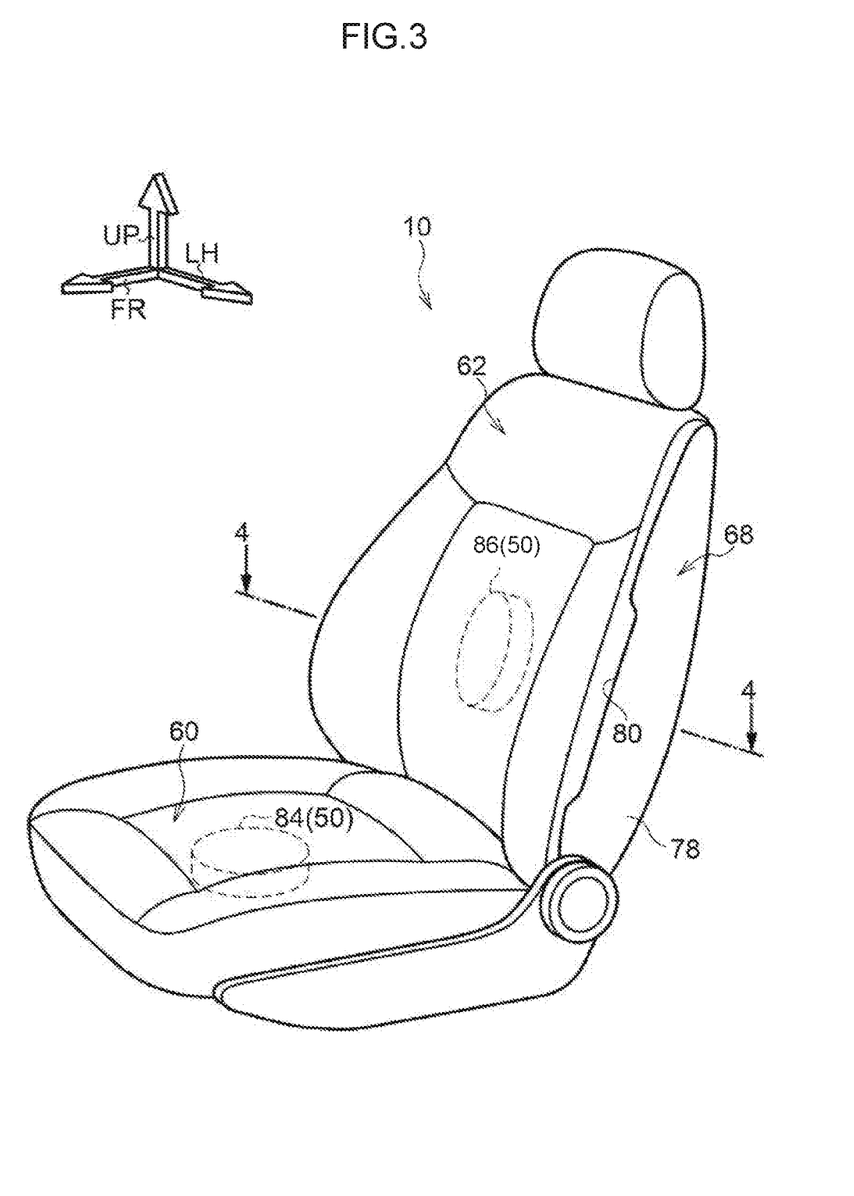
FIG. 3 is a perspective view as seen from a vehicle left-front side showing the vehicle seat according to the first exemplary embodiment.

In addition, as is shown in FIG. 3, the seat ventilation system 50 is provided with a seat cushion fan 84, which is serving as an intake device, and a seat back fan 86 which is also serving as an intake device. The seat cushion fan 84 is provided inside the seat cushion 60 of the front seat 10. When operated, the seat cushion fan 84 attempts to take in air from the vehicle upper side (i.e., the seat upper side) of the seat cushion fan 84. Here, the upholstery covering of the seat cushion 60 is formed from a breathable fabric. Alternatively, if the upholstery covering of the seat cushion 60 is formed from a barely breathable material such as leather or the like, then a number of micro holes are formed penetrating the upholstery covering in the thickness direction thereof.

Because of this, when the seat cushion fan 84 is operated, and air at the vehicle upper side of the seat cushion fan 84 is taken in by the seat cushion fan 84, an airflow (not shown in the drawings) is generated flowing from the vehicle upper side of the seat cushion 60 through the upholstery covering and cushion material of the seat cushion 60 towards the vehicle lower side. Accordingly, if the seat cushion fan 84 is operated while, for example, the front-side vehicle occupant 28 is sitting at the front seat 10, then an airflow (not shown in the drawings) is generated passing from the vehicle front-upper side, the vehicle left-upper side, and the vehicle right-upper side and the like of the seat cushion 60 over the thigh and buttock portions of the front-side vehicle occupant 28.

A portion of the airflow W1 blown from the front face blower portion 26 towards the vehicle rear side merges with the airflow generated by the operation of the seat cushion fan 84. As a consequence, a portion of the airflow W1 flows onto the thigh and buttock portions of the front-side vehicle occupant 28. As a result, if the airflow W1 is cool air, then a cooling sensation can be effectively imparted to the thigh and buttock portions of the front-side vehicle occupant 28.

In contrast to this, the seat back fan 86 is provided inside the seat back 62 of the front seat 10. When operated, the seat back fan 86 attempts to take in air from the vehicle front side of the seat back fan 86. Here, the upholstery covering of the seat back 62 is formed from a breathable fabric. Alternatively, if the upholstery covering of the seat back 62 is formed from a barely breathable material such as leather or the like, then a number of micro holes are formed penetrating the upholstery covering in the thickness direction thereof.

Because of this, when the seat back fan 86 is operated, and air at the vehicle front side of the seat back fan 86 is taken in by the seat back fan 86, an airflow is generated flowing from the vehicle upper side of the seat cushion 60 through the upholstery covering and cushion material of the seat back 62 towards the vehicle lower side. Accordingly, as is shown in FIG. 4, if the seat back fan 86 is operated while, for example, the front-side vehicle occupant 28 is sitting in the front seat 10, then an airflow W7 is generated passing from the vehicle front-left side and the vehicle front-right side and the like of the seat back 62 over both sides in the vehicle width direction of the body of the front-side vehicle occupant 28.

At least a portion of each of the airflow W1 blown from the front face blower portion 26 toward the vehicle rear side, and the respective airflows W5 and W6 flowing towards the vehicle front side along both side surfaces in the vehicle width direction of the pad side portion 76 merges with the airflow W7 generated by the operation of the seat back fan 86. As a consequence, at least a portion of each of the airflows W1, W5, and W6 flows onto the thigh and buttock portions of the front-side vehicle occupant 28. As a result, if the airflows W1, W5, and W6 are cool air, then a cooling sensation can be effectively imparted to both side portions in the vehicle width direction and the like of the body of the front-side vehicle occupant 28.

Figure 1:
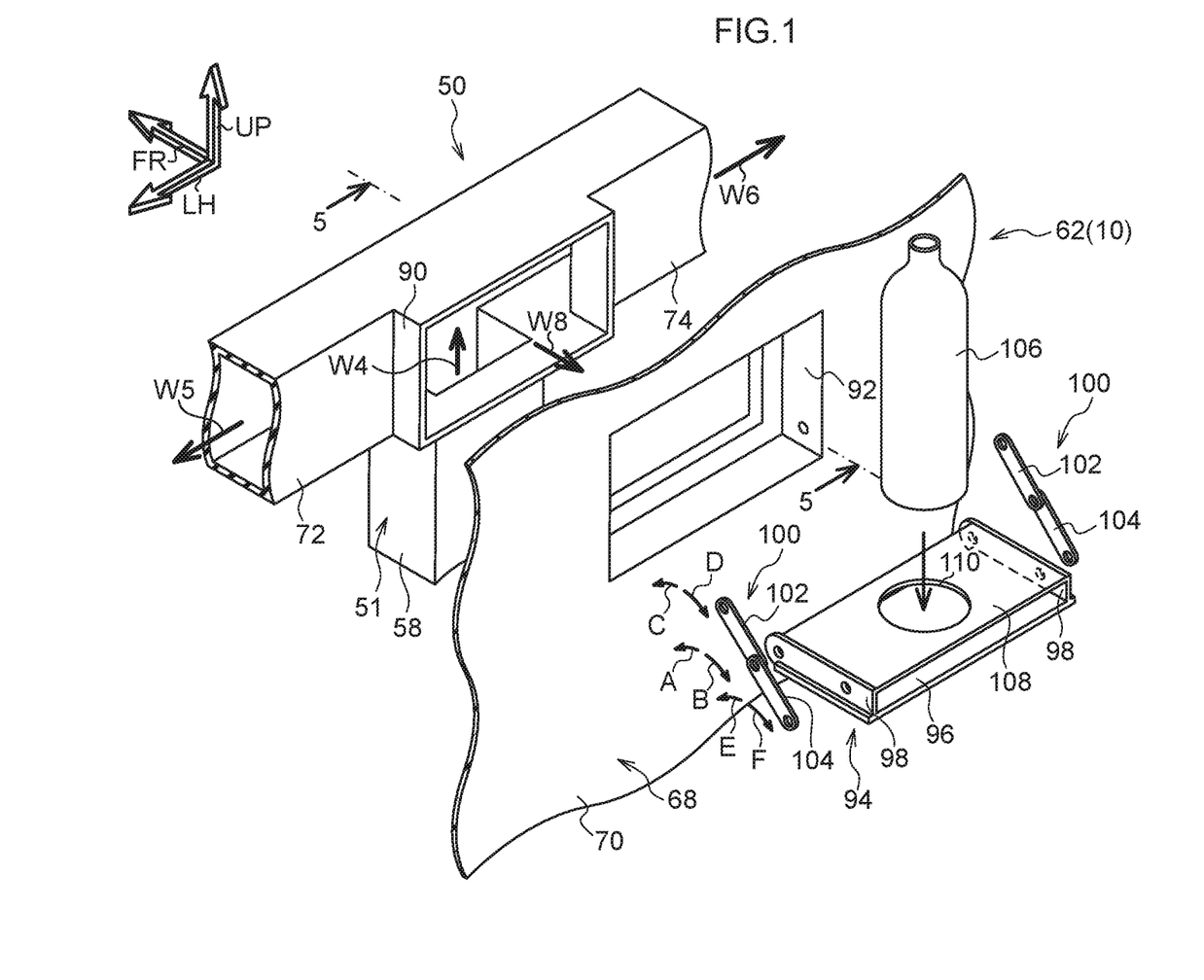
FIG. 1 is an enlarged exploded perspective view as seen from a vehicle left-rear side of a rear-side duct, as well as portions adjacent thereto, of a vehicle seat according to a first exemplary embodiment.

On the other hand, as is shown in FIG. 2 and FIG. 4, a rear-side duct 90 that forms part of the flow path 51 is provided in the vicinity of the other end portion of the seat interior duct 58. As is shown in FIG. 1, one end of the rear-side duct 90 is connected from the vehicle rear side to the seat interior duct 58 at a location where the one end portions of each of the left-side duct 72 and the right-side duct 74 are connected to the other end portion of the seat interior duct 58. Because of this, a portion of the airflow W4 passing through the seat interior duct 58 can be made to flow through an inside of the rear-side duct 90 as an airflow W8 which is serving as conditioned air.

Another end of the rear-side duct 90 is open, and is connected to the backboard 68 from the vehicle front side. An aperture 92 that corresponds to the other end of the rear-side duct 90 is formed at the backboard 68. The aperture 92 is formed, for example, in a substantially rectangular shape that is elongated in the vehicle width direction, and is disposed further towards a vehicle upper side from the upper-side end of the vehicle rear-side end portion of the center console 32 (namely, at the vehicle upper side of the rear face blower portion 34 provided in the center console 32). The airflow W8 flowing through the inside of the rear-side duct 90 is blown towards the vehicle rear side of the seat back 62 by passing through the other end of the rear-side duct 90 and the aperture 92.

Furthermore, a cup holder 94, which is serving as an opening/closing device, is provided at the backboard 68. The cup holder 94 is provided with a plate 96 which is serving as a placement portion. The plate 96 is formed in a substantially rectangular, flat plate shape that is elongated in the vehicle width direction. A pair of side plates 98 are provided at both sides in the vehicle width direction, and on one side in the thickness direction of the plate 96. These side plates 98 are formed in a planar shape, and the thickness direction of the respective side plates 98 is set along the longitudinal direction of the plate 96 (in other words, as the seat width direction). One side plate 98 is withdrawn to the right side in the vehicle width direction from an end at the left side of the plate 96, and stands upright from the surface on one side in the thickness direction of the plate 96. In contrast, the other side plate 98 is withdrawn to the left side in the vehicle width direction from an end at the right side of the plate 96, and stands upright from the surface on the one side in the thickness direction of the plate 96.

An interval between the left and right side plates 98 is set shorter than a dimension in the longitudinal direction of the aperture 92 (i.e., in the vehicle width direction) in the backboard 68, while a dimension in the longitudinal direction of each side plate 98 is set shorter than a dimension in the width direction of the aperture 92. Because of this, the two side plates 98 can be disposed at the inner side of the aperture 92 in such a way that the longitudinal direction of each side plate 98 extends in the width direction of the aperture 92.

Furthermore, when the thickness direction of the plate 96 is extending roughly in the vehicle up-down direction, then the longitudinal direction of the two side plates 98 extends roughly in the vehicle front-rear direction. One end portions in the longitudinal direction of the two side plates 98, which are the end portions at the vehicle front sides thereof when the two side plates 98 are in this state, are joined to the backboard 68 at vehicle lower-side end portions of the aperture 92. Moreover, the two side plates 98 are rotatable in directions around an axis (i.e., in the direction shown by an arrow A and a direction shown by an arrow B in FIG. 1) centered on the portions where the two side plates 98 are joined to the backboard 68, with the axial direction of this rotation extending in the vehicle width direction.

As a result of the two side plates 98 being rotated in a closing direction (i.e., in the direction shown by the arrow A in FIG. 1), the two side plates 98 can be inserted inside the aperture 92 in the backboard 68. In this way, in a closed state which is when the two side plates 98 have been placed inside the aperture 92, the thickness direction of the plate 96 of the cup holder 94 extends roughly in the vehicle front-rear direction, and the aperture 92 is covered from the vehicle rear side by the plate 96 and is closed off.

Additionally, a pair of supporting mechanisms 100 are provided at the cup holder 94. Each supporting mechanism 100 is provided with a pair of arms 102 and 104. These arms 102 and 104 are formed in a flat plate shape, and the thickness direction of the arms 102 and 104 is set as the vehicle width direction. One end portion in the longitudinal direction of the arms 102 is joined to another end portion in the longitudinal direction of the arms 104, and the arms 102 are able to rotate relatively in directions around an axis centered on the portions where the arms 102 are joined to the arms 104, with the axial direction of this rotation extending in the thickness direction of the arms 102 and 104.

Another end portion in the longitudinal direction of the arm 102 is joined to the backboard 68 at the upper-left side in the vehicle width direction at the inner side of the aperture 92. In addition, one end portion in the longitudinal direction of the arm 104 is joined to the other end portion in the longitudinal direction of the side plate 98 on the left side in the vehicle width direction. In contrast, another end portion in the longitudinal direction of the arm 102 of the other supporting mechanism 100 is joined to the backboard 68 at the upper-right side in the vehicle width direction at the inner side of the aperture 92. In addition, one end portion in the longitudinal direction of the arm 104 is joined to the other end portion in the longitudinal direction of the side plate 98 on the right side in the vehicle width direction.

Furthermore, the arms 102 of the two supporting mechanisms 100 are able to be rotated relative to the backboard 68 in directions around an axis (i.e., in the direction shown by an arrow C and a direction shown by an arrow D in FIG. 1) centered on the portions where the arms 102 are joined to the backboard 68, with the axial direction of this rotation extending in the vehicle width direction. In contrast to this, the arms 104 of the two supporting mechanisms 100 are able to be rotated relative to the side plates 98 in directions around an axis (i.e., in the direction shown by an arrow E and a direction shown by an arrow F in FIG. 1) centered on the portions where the arms 104 are joined to the side plates 98, with the axial direction of this rotation extending in the vehicle width direction.

If the two side plates 98 of the cup holder 94 are rotated in the closing direction (i.e., in the direction shown by the arrow A in FIG. 1) around the portion where the side plates 98 are joined to the backboard 68, the arms 102 and 104 are also rotated relatively. As a result of this, the arms 102 and 104 become folded such that the other end portion in the longitudinal direction of the arms 102 and the one end portion in the longitudinal direction of the arms 104 are mutually facing each other in the vehicle width direction, and are housed in this state inside the aperture 92. When the aperture 92 is opened up from this closed state, the cup holder 94 is rotated in an opening direction (i.e., in the direction shown by the arrow B in FIG. 1) towards the vehicle lower-rear side around the join portion where the side plates 98 are joined to the backboard 68.

In conjunction with the rotation of the cup holder 94 in the opening direction, the arms 102 are rotated relatively to the arms 104 around the join portions where the arms 102 are joined to the arms 104 such that the other end portions in the longitudinal direction of the arms 102 move away from the one end portions in the longitudinal direction of the arms 104. When the join portions where the arms 102 are joined to the backboard 68, and the join portions where the arms 102 are joined to the arms 104, and the join portions where the arms 104 are joined to the side plates 98 are located at respective straight lines, then any further rotation in the opening direction of the cup holder 94 is restricted, and the cup holder 94 is in its open state.

In this open state, the other end side in the longitudinal direction of the side plates 98 of the cup holder 94 are supported at the backboard 68 via the two supporting mechanisms 100. In this state, the thickness direction of the plate 96 is roughly the same as the vehicle up-down direction, and a plastic drink bottle 106, which is serving as a type of article, can be placed on the plate 96.

In addition, the cup holder 94 is provided with an inhibiting portion 108. The inhibiting portion 108 is formed in a substantially rectangular plate shape that is elongated in the vehicle width direction. Both ends in the longitudinal direction of the inhibiting portion 108 are joined to end portions of the side plates 98 on the opposite side from the end portions thereof where the plate 96 is joined so that the inhibiting portion 108 is disposed facing the plate 96 while being separated from the plate 96. A circular hole 110 is formed at the inhibiting portion 108. A dimension of an inner diameter of the circular hole 110 is formed, for example, slightly larger than a dimension of an external diameter of a typical plastic drink bottle 106. Because of this, when the cup holder 94 is in the open state, the plastic drink bottle 106 can be placed on the plate 96 of the cup holder 94 with the plastic drink bottle 106 inserted inside the circular hole 110.

Action and Effects of the First Exemplary Embodiment

In the vehicle 12 in which the present front seat 10 has been applied, if, for example, the HVAC unit 14 is operated in cooling mode, cool air is produced in the HVAC unit 14 as an airflow W of conditioned air. A portion of the airflow W flows through the front face duct 24, and is blown as the airflow W1 towards the vehicle rear side from the front face blower portion 26. As a result, the airflow W1 can be blown towards the upper body of the front-side vehicle occupant 28, for example, towards the vicinity of the face portion of the front-side vehicle occupant 28 who is sitting at the front seat 10, so that a cooling sensation can be imparted to the front-side vehicle occupant 28.

Moreover, in this state, the damper of the switching module 44 is set to the second state. In this state, the one ends of both the rear face duct 30 and the rear foot duct 40 are partially opened by the damper. As a result, the airflow W is split so as to flow to both the rear face duct 30 and the rear foot duct 40.

The airflow W flows through the rear face duct 30 and is then blown out towards the vehicle upper-rear side from the rear face blower portion 34, provided at the upper side portion of the vehicle rear side end portion of the center console 32, as the airflow W2. As a result, the airflow W2 can be blown towards the upper body of the rear-side vehicle occupant 38 who is sitting at the rear seat 36, so that a cooling sensation can be imparted to the rear-side vehicle occupant 38.

On the other hand, in the second state of the damper of the switching module 44, the airflow W also flows through the rear foot duct 40. In this state, the seat lower-side fan 54 of the seat ventilation system 50 is operated. Because of this, either the large majority of or all of the airflow W flowing through the rear foot duct 40 is suctioned by the seat lower-side fan 54. As a result, the airflow W4 that flows to the branch duct 52 side flows through the branch duct 52 and the seat-side duct 56 and is then supplied to the seat interior duct 58. The airflow W4 then flows inside the seat interior duct 58 from one end side to the other end side of the seat interior duct 58.

A portion of the airflow W4 that arrives at the other end portion of the seat interior duct 58 flows through the left-side duct 72 to the other end side of the left-side duct 72 as the airflow W5, and through the right-side duct 74 to the other end of the right-side duct 74 as the airflow W6. The airflow W5 that is blown towards the vehicle front side from the other end of the left-side duct 72 is then blown from the left-side blower portion 80 further towards the vehicle front side, and this airflow W5 flows towards the vehicle front side along the left-side surface in the vehicle width direction of the pad side portion 76. In contrast to this, the airflow W6 that is blown towards the vehicle front side from the other end of the right-side duct 74 is then blown from the right-side blower portion 82 further towards the vehicle front side, and this airflow W6 flows towards the vehicle front side along the right-side surface in the vehicle width direction of the pad side portion 76.

Here, in this state, the seat cushion fan 84 and the seat back fan 86 of the seat ventilation system 50 are operated. As a result of the seat cushion fan 84 being operated, on the seat cushion 60 side of the front seat 10, an airflow (not shown in the drawings) is generated passing from the vehicle front-upper side, the vehicle left-upper side, and the vehicle right-upper side and the like of the seat cushion 60 over the thigh and buttock portions of the front-side vehicle occupant 28. A portion of the airflow W1 blown from the front face blower portion 26 towards the vehicle rear side merges with the airflow generated by the operation of the seat cushion fan 84. As a consequence, a portion of the airflow W1, namely, of the cool air flows onto the thigh and buttock portions of the front-side vehicle occupant 28. As a result, a cooling sensation can be effectively imparted to the thigh and buttock portions of the front-side vehicle occupant 28.

In contrast, as a result of the seat back fan 86 being operated, air on the vehicle front side of the seat back 62 is taken inside the seat back 62. As a consequence, an airflow W7 is generated that passes from the vehicle left-front side and the vehicle right-front side and the like of the seat back 62 over both sides in the vehicle width direction of the body of the front-side vehicle occupant 28.

At least a portion of the above-described airflows W1, W5 and W6 merges with the airflow W7 generated by the operation of the seat back fan 86. As a consequence, at least a portion of each of the airflows W1, W5, and W6, namely, of the cool air flows at both side portions in the vehicle width direction and the like of the body of the front-side vehicle occupant 28. As a result, a cooling sensation can be effectively imparted to the both side portions in the vehicle width direction of the body of the front-side vehicle occupant 28.

In this state, if the cup holder 94 is then placed in the opened state, the aperture 92 of the backboard 68, and as a consequence, the other end of the rear-side duct 90 are opened. In this state, a portion of the airflow W4 that reaches the other end portion of the seat interior duct 58 flows through the interior of the rear-side duct 90 as the airflow W8 to the other end side of the rear-side duct 90. As a result, the airflow W8 is blown out towards the vehicle rear side from the aperture 92 in the backboard 68. As a result, the airflow W8, namely, the cool air can be blown onto the upper body of the rear-side vehicle occupant 38 who is sitting at the rear seat 36, and a cooling sensation can be imparted to the rear-side vehicle occupant 38.

Moreover, when the damper of the switching module 44 is in the second state, the airflow W generated in the HVAC unit 14 (namely, the cool air) is split so as to flow to both the rear face duct 30 and the rear foot duct 40. Additionally, in this state, the seat lower-side fan 54 of the seat ventilation system 50 is operated so that the airflow W is forcibly suctioned from the rear foot duct 40 side. Because of this, the airflow W flowing through the rear face duct 30 is reduced, and the result of this is that the airflow W2 blown out from the rear face blower portion 34 is also reduced.

However, in the present exemplary embodiment the airflow W on the rear foot duct 40 side that has been suctioned into the seat lower-side fan 54 flows through the interior of the seat interior duct 58 as the airflow W4, and a portion of this airflow W4 additionally flows from the other end portion of the seat interior duct 58 through the rear-side duct 90 as the airflow W8, and is then blown out from the aperture 92 of the backboard 68 towards the vehicle rear side. As a result, a sufficient quantity of cool air, namely, the airflow W2 and the airflow W8, can be blown onto the rear-side vehicle occupant 38, and a cooling sensation can be effectively imparted to the rear-side vehicle occupant 38.

In other words, when, for example, the damper of the switching module 44 is in the second state, and when an airflow W having a flow rate of, for example, 10 is generated in the HVAC unit 14, out of this flow rate of 10, an airflow W having a flow rate of, for example, 4 flows through the rear face duct 30, and an airflow W having a flow rate of 6 flows through the rear foot duct 40. Accordingly, in this case, although an airflow W having a flow rate of 10 is generated in the HVAC unit 14, an airflow W having a flow rate of only 4 flows to the rear face duct 30.

On the other hand, in this case, an airflow W having a flow rate of 6 flows to the rear foot duct 40. Out of this airflow W having a flow rate of 6, an airflow W having a flow rate of, for example, 5 flows through the interior of the seat interior duct 58 as the airflow W4. Moreover, out of this airflow W4 having a flow rate of 5, an airflow W4 having a flow rate of 2 flows through the rear-side duct 90 as the airflow W8. Accordingly, although an airflow W having a flow rate of only 4 flows to the rear face duct 30, the airflow W8 having a flow rate of 2 flows through the rear-side duct 90 and is blown out towards the vehicle rear side. Because of this, in this case, cool air having a flow rate of 6, namely, the sum of the flow rate of 4 of the airflow W2 blown out from the rear face blower portion 34 and the flow rate of 2 of the airflow W8 flowing through the rear side duct 90 can be blown onto the rear-side vehicle occupant 38. Because of this, a cooling sensation can be more effectively imparted to the rear-side vehicle occupant 38 compared with a structure in which only the airflow W2 having a flow rate of 4 is blown through the rear face duct 30 onto the rear-side vehicle occupant 38.

Furthermore, if the airflow W2 is blown out from the rear face blower portion 34, then this airflow W2 becomes diffused before it reaches the body of the rear-side vehicle occupant 38 who is sitting at an end side in the vehicle width direction of the rear seat 36 (i.e., on a side closer to where one of the front seats 10 is placed than to the center in the vehicle width direction), and the force thereof is weakened. Here, the aperture 92 in the backboard 68 is provided at the vehicle front side of a sitting position at the end side in the vehicle width direction of the rear seat 36 (i.e., on a side closer to where one of the front seats 10 is placed than to the center in the vehicle width direction).

Because of this, the aperture 92 in the backboard 68 is closer to the sitting position of the rear seat 36 than the rear face blower portion 34 provided at the center console 32 which is in the central portion in the vehicle width direction of the front seat 10. Because of this, compared to the airflow W2, the airflow W8 undergoes less diffusion prior to reaching the body of the rear-side vehicle occupant 38, and the force of this airflow W8 is maintained. In this way, by causing the airflow W8 that has less diffusion and whose force is maintained to be blown onto the rear-side vehicle occupant 38, a cooling sensation can be effectively imparted to the rear-side vehicle occupant 38.

Furthermore, the aperture 92 in the backboard 68 is provided at the vehicle upper side of the rear face blower portion 34 provided at the center console 32. Because of this, the distance between the aperture 92 and the upper body portion of the rear-side vehicle occupant 38 is made even closer than the distance between the rear face blower portion 34 and the upper body portion of the rear-side vehicle occupant 38. Because of this, the airflow W8 undergoes less diffusion before reaching the upper body portion of the rear-side vehicle occupant 38 than does the airflow W2, and the force thereof is also maintained. In this way, by causing the airflow W8 that has less diffusion and whose force is maintained to be blown onto the upper body portion of the rear-side vehicle occupant 38, a cooling sensation can be effectively imparted to the rear-side vehicle occupant 38.

Furthermore, as has been described above, when the cup holder 94 is in an open state, an article such as the plastic drink bottle 106 or the like can be placed on the plate 96 of the cup holder 94. In this state, the airflow W8, which is cool air, is blown out from the aperture 92 in the backboard 68. Because of this, the plastic drink bottle 106 and, in turn, the drink inside the plastic drink bottle 106 can be chilled.

Additionally, the plastic drink bottle 106 is inserted through the inner side of the circular hole 110 in the inhibiting portion 108 of the cup holder 94. In this state, if the plastic drink bottle 106 is moved in the vehicle front-rear direction or in the vehicle width direction so that, as a result, the outer circumferential portion of the plastic drink bottle 106 comes up against the inner circumferential portion of the circular hole 110, then any further movement of the plastic drink bottle 106 in the vehicle front-rear direction or in the vehicle width direction is inhibited. As a result, the attitude of the plastic drink bottle 106 on the late 96 can be kept stable.

Furthermore, if no rear-side vehicle occupant 38 is sitting at the rear seat 36 so that, as a consequence, the aperture 92 in the backboard 68 is closed off by the cup holder 94, the passage of the airflow W8 through the aperture 92 is inhibited (or prevented). Accordingly, in this state, the airflow W8 passing through the interior of the rear-side duct 90 is either reduced or stopped. As a result, the airflow W5 flowing through the left-side duct 72 and the airflow W6 flowing through the right-side duct 74 can be increased relatively. As a consequence, a cooling sensation can be effectively imparted to the front-side vehicle occupant 28 sitting at the front seat 10.

Note that in the present exemplary embodiment, a structure is employed in which the cup holder 94 is used as the opening/closing device, and the inhibiting portion 108 having the circular hole 110 is provided at the cup holder 94. However, it is also possible to employ a structure in which the inhibiting portion 108 is not provided at the opening/closing device, and an article is simply placed on top of the plate 96. Moreover, it is also possible to employ a structure in which, for example, in the open state, the portion of the plate 96 located on the opposite side thereof from the portion that is joined to the backboard 68 is not supported on the backboard 68, in other words, a structure in which, in the open state, it is not possible for an article to be placed on top of the plate 96.

Second Exemplary Embodiment

Figure 5:
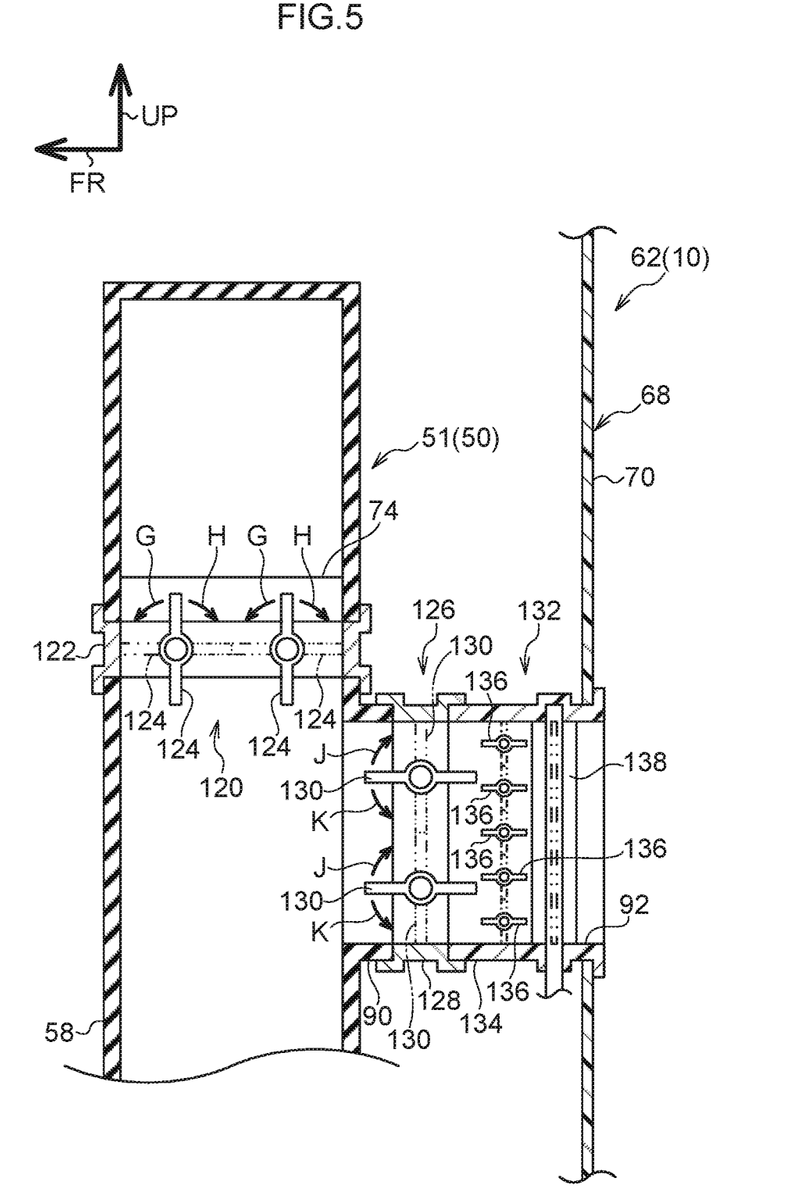
FIG. 5 is a cross-sectional view corresponding to a cross-section across a line 5-5 in FIG. 1 showing an enlargement of a rear-side duct, as well as portions adjacent thereto, of a vehicle seat according to a second exemplary embodiment.

In a second exemplary embodiment shown in FIG. 5, the one end of the rear-side duct 90 is joined to the seat interior duct 58 on the other end side of the seat interior duct 58 from the join portion where the left-side duct 72 (not shown in FIG. 5) and the right-side duct 74 are joined to the seat interior duct 58.

In addition, the present exemplary embodiment is provided with a first damper device 120 which is serving as a restricting device. The first damper device 120 is provided with a first damper frame 122 that forms part of the flow path 51. The first damper frame 122 is formed, for example, in a frame shape or a cylindrical shape whose opening faces in the vehicle up-down direction. The first damper frame 122 is provided between the join portion where the seat interior duct 58 is joined to the rear-side duct 90, and the join portion where the seat interior duct 58 is joined to the left-side duct 72 and the right-side duct 74. The airflow W4 is able to pass through the first damper frame 122.

In addition, one or more (two in the present exemplary embodiment) first dampers 124 are provided at the first damper frame 122. The first dampers 124 are formed in a plate shape that is elongated in the vehicle width direction, and portions located at both ends in a longitudinal direction of the respective first dampers 124, each of the portions is located at a substantially central location in the width direction of the respective first dampers 124, is supported at the first damper frame 122 so as to be able to rotate in directions around an axis (i.e., in the direction shown by an arrow G and a direction shown by an arrow H in FIG. 5), with the axial direction of this rotation extending in the vehicle width direction.

A state in which the width direction of the first dampers 124 extends roughly in the vehicle up-down direction (i.e., the state shown by the solid lines in FIG. 5) is the open state (i.e., is an unrestricted state) of the first damper device 120. In this state, the airflow W4 is able to pass through the first damper frame 122. In contrast to this, a state in which the width direction of the first dampers 124 extends roughly in the vehicle front-rear direction (i.e., the state shown by the double-dot chain lines in FIG. 5) is the closed state (i.e., is a restricted state) of the first damper device 120. In this state, the inside of the first damper frame 122 is closed off by the first dampers 124. Because of this, passage of the airflow W4 through the first damper frame 122 is inhibited.

A rotation shaft of the first dampers 124 is mechanically connected to an output shaft of a first damper motor (not shown in the drawings), and the first dampers 124 are rotated by drive force from the first damper motor. The first damper motor is electrically connected to a control device (not shown in the drawings), and this control device is further electrically connected to a first load sensor (not shown in the drawings) that is provided in the front seat 10 which is serving as a front passenger's seat.

The first load sensor detects a load that is applied to the front seat 10. When the first load sensor detects that a load has been applied when the front-side vehicle occupant 28 sits at the front seat 10, the first damper motor is driven by the control device such that the first damper device 120 is placed in the open state (i.e., in the unrestricted state). In contrast to this, when the front-side vehicle occupant 28 is not sitting at the front seat 10, the load that is applied when the front-side vehicle occupant 28 sits at the front seat 10 is not detected by the first load sensor. In this case, the first damper motor is driven by the control device such that the first damper device 120 is placed in the closed state (i.e., in the restricted state).

In addition, the present exemplary embodiment is also provided with a second damper device 126 which is serving as an opening-closing device. The second damper device 126 is provided with a second damper frame 128 that forms part of the flow path 51. The second damper frame 128 is formed, for example, in a frame shape or a cylindrical shape whose opening faces in the vehicle front-rear direction. The second damper frame 128 is attached to an end portion on the vehicle rear side of the rear-side duct 90, and the airflow W8 is able to pass through the second damper frame 128.

In addition, one or more (two in the present exemplary embodiment) second dampers 130 are provided at the second damper frame 128. The second dampers 130 are formed in a plate shape that is elongated in the vehicle width direction, and portions located at both ends in a longitudinal direction of the respective second dampers 130, each of the portions is located at a substantially central location in the width direction of the respective second dampers 130, are supported at the second damper frame 128 so as to be able to rotate in directions around an axis (i.e., in the direction shown by an arrow J and a direction shown by an arrow K in FIG. 5), with the axial direction of this rotation extending in the vehicle width direction.

A state in which the width direction of the second dampers 130 extends roughly in the vehicle front-rear direction (i.e., the state shown by the solid lines in FIG. 5) is the open state of the second damper device 126. In this state, the airflow W8 is able to pass through the second damper frame 128. In contrast to this, a state in which the width direction of the second dampers 130 extends roughly in the vehicle up-down direction (i.e., the state shown by the double-dot chain lines in FIG. 5) is the closed state of the second damper device 126. In this state, the inside of the second damper frame 128 is closed off by the second dampers 130. Because of this, passage of the airflow W8 through the second damper frame 128 is inhibited.

A rotation shaft of the second dampers 130 is mechanically connected to an output shaft of a second damper motor (not shown in the drawings), and the second dampers 130 are rotated by drive force from the second damper motor. The second damper motor is electrically connected to a control device (not shown in the drawings), and this control device is further electrically connected to a second load sensor (not shown in the drawings) that is provided in the rear seat 36.

The second load sensor detects a load that is applied to the rear seat 36. When the second load sensor detects that a load has been applied when the rear-side vehicle occupant 38 sits at the rear seat 36, the second damper motor is driven by the control device such that the second damper device 126 is placed in the open state. In contrast to this, when the rear-side vehicle occupant 38 is not sitting at the rear seat 36, the load that is applied when the rear-side vehicle occupant 38 sits at the rear seat 36 is not detected by the second load sensor. In this case, the second damper motor is driven by the control device such that the second damper device 126 is placed in the closed state.

Furthermore, the present exemplary embodiment is also provided with an airflow deflection device 132 which is serving as an opening-closing device. The airflow deflection device 132 is provided with a frame component 134 that forms part of the flow path 51. The frame component 134 is formed, for example, in a frame shape or a cylindrical shape whose opening faces in the vehicle front-rear direction. An end portion on the vehicle front side of the frame component 134 is attached to an end portion on the vehicle rear side of the second damper frame 128 of the second damper device 126, and the airflow W8 that has passed through the second damper frame 128 is able to pass through the frame component 134. In addition, an end portion on the vehicle rear side of the frame component 134 is inserted through the aperture 92 in the backboard 68 and is attached to the backboard 68. Because of this, the airflow W8 is blown out towards the vehicle rear side through the aperture 92 in the backboard 68 by passing through the frame component 134.

Plural first fins 136 which are serving as airflow deflection components are provided inside the frame component 134. These first fins 136 are formed in a plate shape that is elongated in the vehicle width direction, and are arranged in a row at predetermined intervals from each other in the vehicle up-down direction. Portions located at both ends in the longitudinal direction of the respective first fins 136, each of the portions is located at a substantially central portion in the width direction of the respective first fins 136, are supported at the frame component 134 so as to be able to rotate in directions around an axis, with the axial direction of this rotation extending in the vehicle width direction.

As a result of the first fins 136 being rotated, the angle of inclination in the vehicle up-down direction of the first fins 136 relative to the vehicle front-rear direction changes. As a result, when the airflow W8 flows past the sides of the first fins 136, the airflow W8 flows along the width direction of the first fins 136 so that the direction of flow of the airflow W8 changes in the vehicle up-down direction. Furthermore, when the first fins 136 have been rotated such that the width direction of the first fins 136 extends in the vehicle up-down direction, the gap between the first fins 136 that are mutually adjacent in the vehicle up-down direction is reduced to a minimum, and passage of the airflow W8 past the sides of the first fins 136 is restricted.

Plural second fins 138 (in FIG. 5, only one fin located substantially in the central portion in the vehicle width direction is shown), which are serving as airflow deflection components, are provided at the vehicle rear side of the first fins 136 inside the frame component 134. These second fins 138 are formed in a plate shape that is elongated in the vehicle up-down direction, and are arranged in a row at predetermined intervals from each other in the vehicle width direction. Portions located at both ends in the longitudinal direction of the respective second fins 138, each of the portions is located at a substantially central location in the width direction of the respective second fins 138, are supported at the frame component 134 so as to be able to rotate in directions around an axis, with the axial direction of this rotation extending in the vehicle up-down direction.

As a result of the second fins 138 being rotated, the angle of inclination in the vehicle width direction of the second fins 138 relative to the vehicle front-rear direction changes. As a result, when the airflow W8 flows past the sides of the second fins 138, the airflow W8 flows along the width direction of the second fins 138 so that the direction of flow of the airflow W8 change in the vehicle width direction. Furthermore, when the second fins 138 have been rotated such that the width direction of the second fins 138 extends in the vehicle width direction, the gap between the second fins 138 that are mutually adjacent in the vehicle width direction is reduced to a minimum, and passage of the airflow W8 past the sides of the second fins 138 is restricted.

Furthermore, the airflow deflection device 132 is also provided with an operating component (not shown in the drawings). The operating component is formed by a dial or lever or the like, and this is provided at an end portion at the vehicle rear side of the frame component 134, or in a position at the backboard 68 where it can be operated by the rear-side vehicle occupant 38. The operating component is mechanically connected to a rotation shaft of the first fins 136 and to a rotation shaft of the second fins 138, and the first fins 136 and the second fins 138 are rotated as a result of this operating component being operated. As a consequence, the rear-side vehicle occupant 38 is able to adjust the direction of flow of the airflow W8.

Action and Effects of the Second Exemplary Embodiment

In the second exemplary embodiment having the structure described above, when the front-side vehicle occupant 28 is not sitting at the front seat 10 (i.e., the front passenger's seat), the load that is applied when the front-side vehicle occupant 28 sits at the front seat 10 is not detected by the first load sensor. In this state, the first damper motor is driven by the control device such that the first damper device 120 is placed in the closed state (i.e., in the restricted state). As a result, the first dampers 124 are rotated such that the width direction of the first dampers 124 extends roughly in the vehicle front-rear direction. As a result, the interior of the first damper frame 122 is closed off by the first dampers 124, and passage of the airflow W4 through the damper frame 122 is either inhibited or prevented. As a result of the flow of the airflow W4 towards the other end of the seat interior duct 58 being either inhibited or prevented in this way, the flow of the airflow W5 inside the left-side duct 72, and the flow of the airflow W6 inside the right-side duct 74 are either inhibited or prevented.

In this state, if the rear-side vehicle occupant 38 sits at the rear seat 36, and the second load sensor detects the load that is applied when the rear-side vehicle occupant 38 is sitting at the rear seat 36, then the second damper motor is driven by the control device such that the second damper device 126 is placed in the open state. As a result of this, the second dampers 130 are rotated such that the width direction of the second dampers 130 extends roughly in the vehicle front-rear direction. As a result, the interior of the second damper frame 128 is opened up, and the airflow W8 is able to pass through the second damper frame 128.

Here, in this state, the flow of the airflow W4 towards the other end of the seat interior duct 58 is inhibited, and the flow of the airflow W5 inside the left-side duct 72 and also the flow of the airflow W6 inside the right-side duct 74 are either inhibited or blocked. Because of this, the airflow W4 flowing from the seat interior duct 58 towards the rear-side duct 90, in other words, the airflow W8 flowing through the rear-side duct 90 is increased relatively. As a result, the airflow W8 blown from the vehicle rear-side end portion (i.e., the seat rear-side end portion) of the frame component 134 of the airflow deflection device 132 towards the vehicle rear side, can be increased, and a cooling sensation can be imparted effectively to the rear-side vehicle occupant 38 sitting at the rear seat 36.

Furthermore, if, in this state, the operating component of the airflow deflection device 132 is operated by the rear-side vehicle occupant 38 so that the first fins 136 are rotated such that the width direction of the first fins 136 extends in the vehicle up-down direction, or if the second fins 138 are rotated such that the width direction of the second fins 138 extends in the vehicle width direction, then the passage of the airflow W8 through the frame component 134 is either inhibited or prevented. As a result, the discharge of the airflow W8 from the end portion on the vehicle rear side of the frame component 134 towards the vehicle rear side can be either inhibited or prevented. As a result, the airflow W8 can be inhibited from being blown towards the rear-side vehicle occupant 38.

In contrast, when, for example, the rear-side vehicle occupant 38 is not sitting at the rear seat 36, the load that is applied when the rear-side vehicle occupant 38 sits at the rear seat 36 is not detected by the second load sensor. In this state, the second damper motor is driven by the control device such that the second damper device 126 is placed in the closed state. As a result, the second dampers 130 are rotated such that the width direction of the second dampers 130 extends roughly in the vehicle up-down direction. The interior of the second damper frame 128 is closed off by the second dampers 130. As a consequence, passage of the airflow W8 through the second damper frame 128 is either inhibited or prevented and, furthermore, the flow of the airflow W4 from the seat interior duct 58 towards the rear-side duct 90 is also inhibited or prevented.

In this state, if the front-side vehicle occupant 28 sits at the front seat 10, and the first load sensor detects the load that is applied when the front-side vehicle occupant 28 is sitting at the front seat 10, then the first damper motor is driven by the control device such that the first damper device 120 is placed in the open state (i.e. in the unrestricted state). As a result of this, the first dampers 124 are rotated such that the width direction of the first dampers 124 extends roughly in the vehicle up-down direction. The interior of the first damper frame 122 is opened up, and the airflow W4 is able to pass through the first damper frame 122.

Here, in this state, the flow of the airflow W4 from the seat interior duct 58 towards the rear-side duct 90 is inhibited. Because of this, the airflow W4 flowing towards the other end of the seat interior duct 58, in other words, the airflow W5 flowing through the left-side duct 72 and also the airflow W6 flowing though the right-side duct 74 increase relatively. As a consequence, the airflow W5 blown out from the left-side blower portion 80, and the airflow W6 blown out from the right-side blower portion 82 can be increased. As a result of the increased airflows W5 and W6 merging into a flow with the airflow W7 in this way, a cooling sensation can be effectively imparted to the front-side vehicle occupant 28 sitting in the front seat 10.

Note that in the present exemplary embodiment, the drive device of the first damper device 120 that is used to rotate the first dampers 124 is the first damper motor, and the drive device of the second damper device 126 that is used to rotate the second dampers 130 is the second damper motor. However, it is also possible for these drive devices to be formed by solenoids in which a magnetic plunger is moved when supplied with electric power. In other words, provided that the drive device has a structure in which the first dampers 124 or the second dampers 130 can be rotated by drive force output from the drive device, then an optional type of drive device can be employed and the specific type thereof is not particularly restricted. In other words, it is also possible to employ a structure in which instead of using drive devices such as those described above, a damper operating component is provided at a position where it can be operated by the front-side vehicle occupant 28 or the rear-side vehicle occupant 38, and the first damper 124 or the second damper 130 are rotated as a result of the damper operating component being operated manually.

Moreover, in the present exemplary embodiment, a structure is employed in which the first damper device 120 which is serving as a restricting device, and the second damper device 126 which is serving as an opening/closing device are both provided, however, it is also possible to employ a structure in which only one of the restricting device and the opening/closing device is provided.

Furthermore, in the present exemplary embodiment, a structure that is provided with the airflow deflection device 132 is employed, however, it is also possible to employ a structure in which the airflow deflection device 132 is not provided. Additionally, this type of airflow deflection device 132 may also be used in the above-described first exemplary embodiment.

Moreover, in each of the above-described embodiments, a structure is employed in which the rear face duct 30 is provided, and the airflow W2 is blown towards the upper body portion of the rear-side vehicle occupant 38 from the rear face blower portion 34 provided at the vehicle rear-side end portion of the center console 32. However, it is also possible to employ a structure in which the rear face duct 30 is not provided, and only the airflow W8 that is blown from the rear-side duct 90 towards the vehicle rear side is blown towards the upper body portion of the rear-side vehicle occupant 38.

Furthermore, the seat ventilation system 50 of the above-described respective exemplary embodiments is formed such that the airflows W1, W5, and W6, which are airflows of cool air, are merged with an airflow generated as a result of the seat cushion fan 84 being operated and with the airflow W7 generated as a result of the seat back fan 86 being operated, and this is used to supply cool air to the vicinity of the body of the front-side vehicle occupant 28. However, it is also possible to employ a structure in which the airflow W4, which is an airflow of cool air, is discharged towards the body of the front-side vehicle occupant 28 from the seat cushion 60 and the seat back 62 of the front seat 10.

Moreover, in the above-described respective embodiments, a structure provided with the seat ventilation system 50 is employed. However, it is also possible to employ a structure in which the left-side duct 72 and the right-side duct 74 are not provided, and the entire airflow W4 flowing through the seat interior duct 58 is supplied to the rear-side duct 90, and is blown out as the airflow W8 (namely, as cool air) towards the vehicle rear side of the front seat 10.

Furthermore, in the above-described respective embodiments, a structure is described in which the present disclosure is applied to the front seat 10 of the vehicle 12. However, it is also possible, for example, in a vehicle 12 in which three or more rows of seats are provided in the vehicle front-rear direction of the vehicle 12, for the present disclosure to be applied to the second and subsequent rows of seats from the vehicle front side. In other words, provided that the seat is mounted in the vehicle 12, then the present disclosure is not limited to the front seat 10 and can be broadly applied.

In addition, in the above-described respective exemplary embodiments, the respective directions that are based on the vehicle 12, namely, the vehicle front-rear direction, the vehicle up-down direction, and the vehicle width direction, and the like are the same as the respective directions based on the front seat 10, namely, the seat front-rear direction, the seat up-down direction, and the seat width direction. However, the present disclosure may also be applied to a vehicle 12 in which the respective directions based on the vehicle 12 and the respective directions based on the front seat 10 are not the same.

Exemplary embodiments of the present disclosure have been described above, however, the present disclosure is not limited to this. Various modifications and the like may be made to the present disclosure insofar as they do not depart from the scope of the present disclosure.

What is claimed is:

1. A vehicle seat comprising:
a seat main body having a seat back, and disposed at a vehicle front side of a seating position at an end side in a vehicle width direction of a rear seat;
a flow path having a first end and a second end, conditioned air flowing through the first end, the conditioned air being produced by an air-conditioning device mounted at the vehicle, the second end of the flow path opening at a vehicle rear side of the seat back, and the conditioned air flowing through an inside of the flow path and being blown towards the vehicle rear side of the seat back; and
an opening/closing device provided at the flow path or at the seat back so as to be able to open and close the flow path, when the opening/closing device is in an open state, the opening/closing device allowing the conditioned air to be blown towards the vehicle rear side of the seat back, and when the opening/closing device is in a closed state, the opening/closing device closing off the flow path so as to inhibit or prevent the conditioned air from being blown towards the vehicle rear side of the seat back, the opening/closing device further comprising an inhibiting portion and a plate spaced apart from the inhibiting portion, the inhibiting portion having an opening formed therein for receiving a container.

2. The vehicle seat according to claim 1, wherein the opening/closing device is provided with a placement portion that is provided at the seat back, when the opening/closing device is in the closed state, the placement portion closes off the second end of the flow path, when the opening/closing device is in the open state, the placement portion extends towards a vehicle rear side from the seat back, and an article is able to be placed on the placement portion at the vehicle rear side of the second end of the flow path.

3. The vehicle seat according to claim 2, wherein the inhibiting portion is able to contact the article placed on the placement portion from a vehicle front-rear direction side and from a vehicle width direction side thereof, and the inhibiting portion, by contacting the article, is able to inhibit movement of the article in the vehicle front-rear direction and in the vehicle width direction.

4. The vehicle seat according to claim 1, wherein the second end of the flow path is configured to be disposed further toward a vehicle upper side than a vehicle rear-side end portion of a center console that is provided closer to a central portion in the vehicle width direction than the seat main body.

5. The vehicle seat according to claim 1, wherein a branch is formed at the flow path between the first end and the second end thereof so that the flow path is able to extend to both sides in the vehicle width direction of the seat back and opens at both sides of the seat back, and the conditioned air can be discharged through openings at both sides towards a vehicle front side of the seat back.

6. The vehicle seat according to claim 5, further comprising a restricting device provided at the flow path, and being able to switch between an unrestricted state in which the conditioned air is capable of being blown towards the vehicle front side of the seat back, and a restricted state in which the blowing of the conditioned air towards the vehicle front side of the seat back is restricted.

* * * * *

UNITED STATES PATENT AND TRADEMARK OFFICE
CERTIFICATE OF CORRECTION

PATENT NO. : 10,967,768 B2
APPLICATION NO. : 16/523162
DATED : April 6, 2021
INVENTOR(S) : Kazuyuki Shiga Page 1 of 1

It is certified that error appears in the above-identified patent and that said Letters Patent is hereby corrected as shown below:

In the Specification

In Column 6, Line(s) 47, after "duct 56", insert --.--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*